United States Patent Office 2,918,473
Patented Dec. 22, 1959

2,918,473

5-(5-NITRO-2-FURYL)-1,3,4-OXADIAZOLINE-2-ONE OR THIONE AND PROCESS

William R. Sherman, Waukegan, Ill., assignor to Abbott Laboratories, North Chicago, Ill., a corporation of Illinois No Drawing. Application October 30, 1958
Serial No. 770,598

6 Claims. (Cl. 260—307)

This invention relates to novel chemical compounds having the formula:

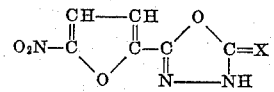

wherein X represents oxygen or sulfur. These new compounds are crystalline solids somewhat soluble in many organic solvents and of very low solubility in water. They have been found to be active as parasiticides and, particularly, as coccidiostats and antibacterial agents. They are adapted to be employed as active toxic constituents of disinfectant compositions for the control of microorganisms such as *Micrococcus pyogenes* var. *aureus*, *Salmonella typhimurium* and *Escherichia coli*. For such use, the compounds may be dispersed on an inert, finely divided solid and employed as a dust. Alternatively, they may be dispersed in water and employed as a spray. The products may likewise be employed as constituents of oil and water emulsions with or without a wetting, dispersing or emulsifying agent. In representative operations, 5-(5 - nitro - 2 - furyl) - 1,3,4 - oxadiazoline - 2 - one gave complete inhibition of the growth of *Micrococcus pyogenes* var. *aureus*, *Salmonella typhimurium*, *Proteus vulgaris*, *Proteus mirabilis* and *Escherichia coli* when employed as an aqueous composition containing 50 parts by weight of said compound per million parts by weight of ultimate mixture.

The new compounds may be prepared by the reaction of phosgene or thiophosgene with 5-nitro-2-furoylhydrazide having the formula:

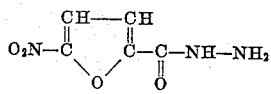

The reaction is carried out in the presence of an inert solvent such as dilute aqueous hydrochloric acid or dioxane. Good results are obtained when employing substantially equimolar proportions of the reactants. The reaction takes place smoothly at temperatures of from 0° C. to 80° C. with the formation of the desired product and hydrogen chloride of reaction. Upon completion of the reaction, the desired product may be separated in conventional fashion.

In carrying out th reaction, 5-nitro-2-furoylhydrazide dissolved in the reaction solvent is reacted with phosgene or thiophosgene by introducing phosgene gas or liquid thiophosgene beneath the surface of the liquid reaction mixture. The reaction is carried out with stirring and at a temperature of from 0° C. to 80° C. The desired product which precipitates as a solid during the reaction may be separated from the reaction mixture by filtration and further purified by crystallization from a suitable solvent.

The following examples illustrate the invention, but are not to be construed as limiting:

EXAMPLE I

*5-(5-nitro-2-furyl)-1,3,4-oxadiazoline-2-one*

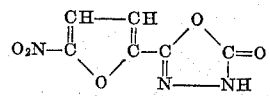

5-nitro-2-furoylhydrazide (50.15 grams, 0.30 mole) was dissolved in 500 milliliters of a dilute aqueous solution of hydrochloric acid containing one part of concentrated hydrochloric acid and ten parts of water. The resulting solution was cooled to a temperature of 10° C. and phosgene gas introduced beneath the surface of the liquid reaction mixture with constant stirring for a period of one hour. The solid product which formed during the reaction was separated by filtration. Upon crystallization from an acetone-water mixture, there was obtained a 5-(5-nitro-2-furyl)-1,3,4-oxadiazoline-2-one product as a crystalline, cream-colored solid which melted at 201°-202° C. with decomposition. This product contained 36.36 percent carbon, 1.80 percent hydrogen and 40.36 percent oxygen compared to the calculated values of 36.56 percent, 1.52 percent and 40.59 percent, respectively.

EXAMPLE II

*5-(5-nitro-2-furyl)-1,3,4-oxadiazoline-2-thione*

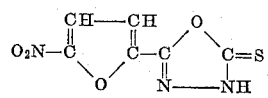

A solution of 3.47 grams (0.02 mole) of 5-nitro-2-furoylhydrazide and 2.64 grams (0.02 mole) of thiophosgene in 75 ml. of dioxane was heated on a steam bath for one hour. The reaction mixture was then treated with charcoal, filtered and the filtrate diluted with cyclohexane. Upon cooling the diluted solution, the desired 5-(5-nitro-2-furyl)-1,3,4-oxadiazoline-2-thione precipitated as a yellow crystalline solid which, after recrystallization from water, melted at 155°-156° C. with decomposition.

*Analysis.*—Calcd. for $C_6H_3N_3O_4S$: C=33.81%; H=1.42%; N=19.72%. Found: C=34.04%; H=1.59%; N=19.67%.

I claim:
1. A compound having the formula:

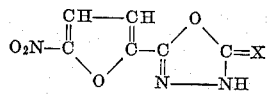

wherein X represents a member of the group consisting of oxygen and sulfur.
2. 5-(5-nitro-2-furyl)-1,3,4-oxadiazoline-2-one.
3. 5-(5-nitro-2-furyl)-1,3,4-oxadiazoline-2-thione.
4. A method for the manufacture of a compound having the formula:

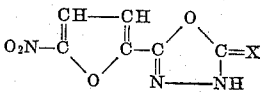

wherein X represents a member of the group consisting of oxygen and sulfur which comprises reacting 5-nitro-2-furoylhydrazide with a member of the group consisting of phosgene and thiophosgene.

5. A method for the manufacture of 5-(5-nitro-2-furyl)-1,3,4-oxadiazoline-2-one which comprises reacting equimolar quantities of 5-nitro-2-furoylhydrazide and phosgene at a temperature of from 0° to 80° C. and recovering the resultant product.

6. A method for the manufacture of 5-(5-nitro-2-furyl)-1,3,4-oxadiazoline-2-thione which comprises reacting equimolar quantities of 5-nitro-2-furoylhydrazide and thiophosgene at a temperature of from 0° to 80° C. and recovering the resultant product.

References Cited in the file of this patent

Yale et al.: Chem. Abstracts, vol. 49, col. 3964 (1955).